US009121723B2

(12) United States Patent
Deng et al.

(10) Patent No.: US 9,121,723 B2
(45) Date of Patent: Sep. 1, 2015

(54) AUTOMATIC POSITIONING SYSTEM AND METHOD OF USING SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Hong-Fei Deng, Shenzhen (CN); Yang Xin, Shenzhen (CN); Jun Zhang, Shenzhen (CN); Tsung-Jen Chuang, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/253,959

(22) Filed: Apr. 16, 2014

(65) Prior Publication Data

US 2014/0316693 A1    Oct. 23, 2014

(30) Foreign Application Priority Data

Apr. 17, 2013   (CN) .................. 2013 1 01326795

(51) Int. Cl.
*G01C 21/00* (2006.01)
*G08G 1/123* (2006.01)
*G01C 21/36* (2006.01)

(52) U.S. Cl.
CPC .......... *G01C 21/362* (2013.01); *G01C 21/3629* (2013.01); *G01C 21/3676* (2013.01)

(58) Field of Classification Search
CPC ........... B60T 2210/36; B60T 2250/03; B60W 2720/125; G01S 13/62; B60G 2400/104; B60G 2400/106; B60K 7/0007; B60K 28/06; B60N 2/002; B60Q 9/00; B60Q 1/484; B60Q 1/50; B60Q 2400/50; B60Q 9/004; G01C 19/00
USPC .................... 701/400–541; 340/988–996
See application file for complete search history.

(56) References Cited

U.S. PATENT DOCUMENTS

| | | | |
|---|---|---|---|
| 2004/0119612 A1* | 6/2004 | Chen | 340/995.13 |
| 2009/0079591 A1* | 3/2009 | Motoyama | 340/991 |
| 2010/0211307 A1* | 8/2010 | Geelen | 701/201 |
| 2010/0304754 A1* | 12/2010 | Czompo et al. | 455/456.1 |
| 2011/0218700 A1* | 9/2011 | Mori et al. | 701/29 |

* cited by examiner

*Primary Examiner* — Muhammad Shafi
(74) *Attorney, Agent, or Firm* — Novak Druce Connolly Bove + Quigg LLP

(57) ABSTRACT

The present disclosure provides an automatic positioning system that is in a mobile device. The mobile device communicates with a vehicle. The system includes a first detection module, a second detection module and a positioning module. The first detection module detects the mobile device is in a moving state or a static state in real-time. The second detection module detects the vehicle is in a moving state or a static state in real-time. The positioning module acquires the location of the mobile device and records the acquired location as a position where the vehicle is parked in the mobile device, when the vehicle changes from the moving state to the static state, the mobile device changes from the static state to the moving state.

10 Claims, 2 Drawing Sheets

AUTOMATIC POSITIONING SYSTEM AND METHOD OF USING SAME

FIELD

The disclosure generally relates to positioning technologies, more particularly, to an automatic positioning system and method using same.

BACKGROUND

Vehicles bring convenience to everyday life. However, when a vehicle is parked in an unfamiliar place or a large parking lot, it may be difficult for the driver of the vehicle to quickly find the parked vehicle.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable median include CDs, DVDs, BLU-RAY, flash memory, and hard disk drives.

Figure 1:
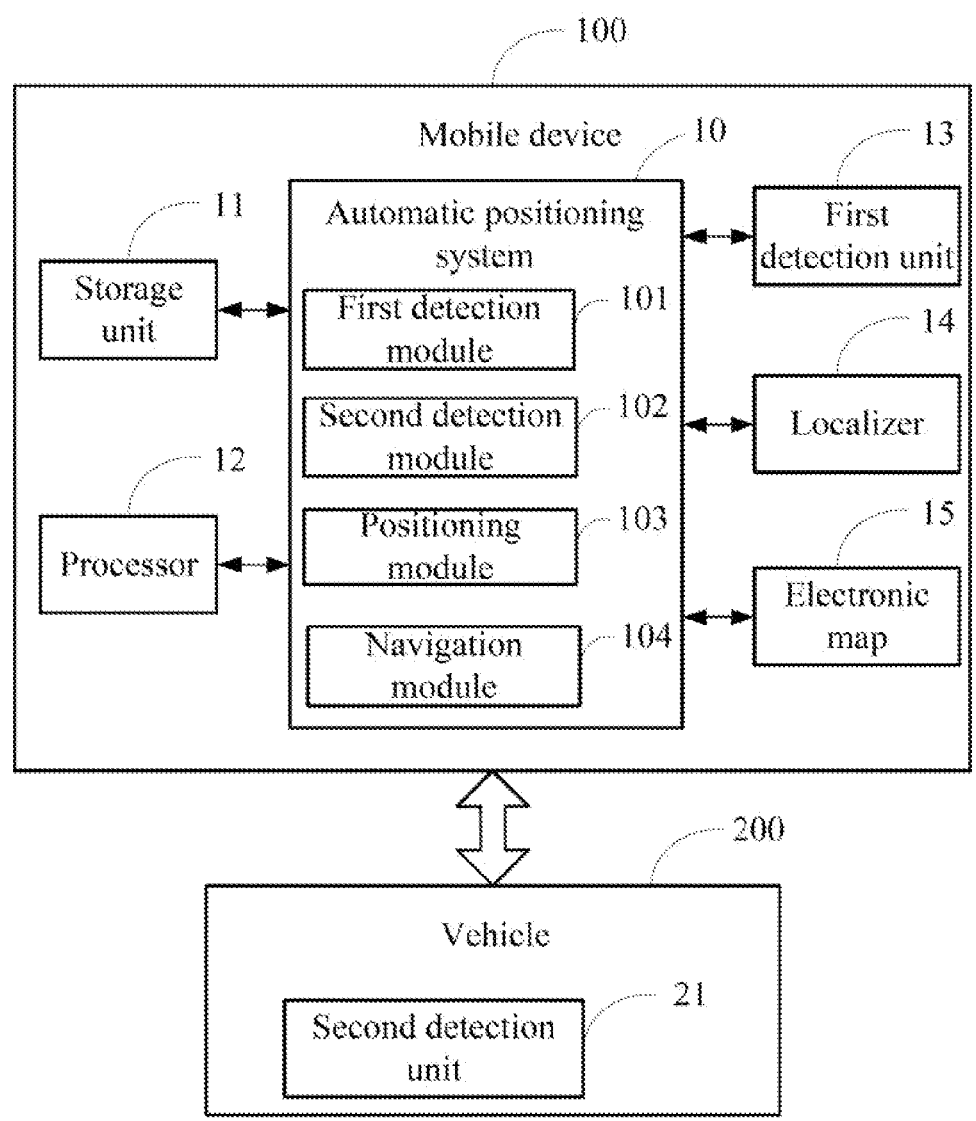
FIG. 1 is a schematic block diagram of an automatic positioning system including a plurality of functional modules.

FIG. 1 shows a schematic block diagram of an automatic positioning system 10. The automatic positioning system 10 is installed in and implemented by a mobile device 100. The mobile device 100 communicates with a vehicle 200.

The mobile device 100 includes a storage unit 11, a processor 12, a first detection unit 13, a localizer 14 and an electronic map 15. In this embodiment, the localizer 14 is a Global Positioning System (GPS). The electronic map 15 is stored in the storage unit 11. The mobile device 100 positions the vehicle 200 via the localizer 14 and the electronic map 15.

The vehicle 200 includes a second detection unit 21. The mobile device 100 is connected to the vehicle 200 via a wireless connection, such as BLUETOOTH® or WIFI®. In this embodiment, the mobile device 100 may be, but is not limited to, a mobile phone, a tablet PC, a mobile internet device or the other mobile communication devices.

The automatic positioning system 10 detects whether a user stops and leaves the vehicle 200 or not by comparing the motion states of the mobile device 100 and the vehicle 200. When the user stops and leaves the vehicle 200, the automatic positioning system 10 stores the location of the vehicle 200 in the mobile device 100, and thus the user can find the vehicle 200 quickly through the mobile device 100.

The automatic positioning system 10 includes a first detection module 101, a second detection module 102, a positioning module 103, and a navigation module 104.

Figure 2:
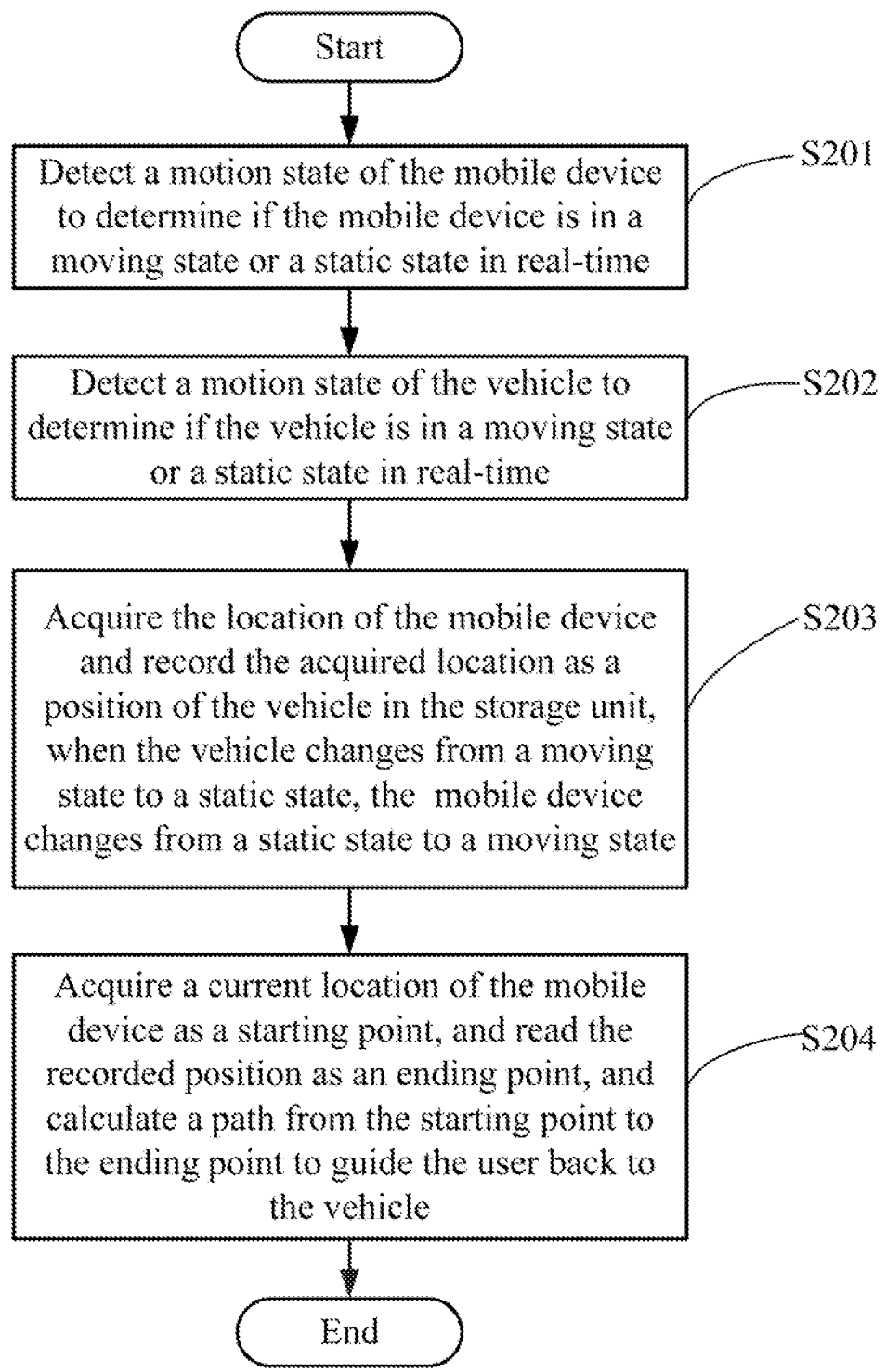
FIG. 2 is a flowchart of one embodiment of an automatic positioning method.

FIG. 2 shows a flowchart of one embodiment of an automatic positioning method of FIG. 1. Depending on the embodiment, additional steps may be added, others removed, and the ordering of the steps may be changed.

In step S201, the first detection module detects a motion state of the mobile device 100 to determine if the mobile device 100 is in a moving state or a static state in real-time. In detail, the first detection module detects a current speed of the mobile device 100 through the first detection unit, and determines if the mobile device 100 is in a moving state or a static state according to the detected speed. In this embodiment, the first detection unit is a speed sensor. The first detection module controls the speed sensor to detect the current speed of the mobile device 100.

In step S202, the second detection module detects a motion state of the vehicle 200 to determine if the vehicle 200 is in a moving state or a static state in real-time. In detail, the second detection module sends a state detecting command to the vehicle 200 to detect a current speed of the vehicle 200 through the second detection unit, and determines if the vehicle 200 is in a moving state or a static state according to the detected speed. In this embodiment, the second detection unit is a speed sensor. The second detection module sends the state get command to the vehicle 200 via BLUETOOTH®.

In step S203, the positioning module acquires the location of the mobile device 100 and record the acquired location as a position of the vehicle 200 in the storage unit 11, when the vehicle 200 changes from a moving state to a static state, the mobile device 100 changes from a static state to a moving state. In detail, the positioning module acquires the location of the mobile device 100 through the localizer. The positioning module marks the acquired location on the electronic map, and thus the user can find the vehicle 200 quickly via the electronic map.

It is understood that, both of the mobile device 100 and the vehicle 200 are in a moving state when a user with the mobile device 100 is driving the vehicle 200.

Both of the mobile device 100 and the vehicle 200 are in a static state when the user with the mobile device 100 stops the vehicle 200, such when the vehicle 200 is stopped for a red light.

The vehicle 200 changes from a moving state to a static state when the vehicle 200 is parked, and the mobile device 100 changes from the parked static state to a moving state when the user with the mobile device 100 leaves the vehicle 200. Thus, the positioning module 103 acquires the location of the mobile device 100 and records the acquired location where the vehicle 200 is parked, and the user can find the vehicle 200 quickly through the mobile device 100.

In step S204, the navigation module acquires a current location of the mobile device 100 as a starting point, reads the recorded position as an ending point, and calculate a path from the starting point to the ending point to guide the user back to the vehicle 200. In this embodiment, the mobile device provides a user interface including an option for the user to find the vehicle 200. The user can find the vehicle 200 quickly by selecting the option to execute the step S204. The navigation module acquires the location of the mobile device 100 through the localizer, and calculates a shortest path from the mobile device 100 to the vehicle 200. The navigation module shows the path on the electronic map. In this embodiment, the calculated path is shown on the electronic map as a color line, and the navigation module guides the user to the vehicle 200 by voice.

It is believed that the discussed embodiments and their advantages will be understood from the foregoing description, and it will be apparent that various changes may be made thereto without departing from the disclosure or sacrificing all of its material advantages. The embodiments discussed herein do not limit the following claims.

What is claimed is:

1. An automatic positioning system in a mobile device, the mobile device communicating with a vehicle via a wireless network, the automatic positioning system comprising:
   a first detection module that detects a motion state of the mobile device to determine if the mobile device is in a moving state or a static state in real-time;
   a second detection module that detects a motion state of the vehicle to determine if the vehicle is in a moving state or a static state in real-time;
   a positioning module that acquires the location of the mobile device and records the acquired location as a position of the vehicle in the mobile device, under a condition that the second detecting module determines the vehicle changes from a moving state to a static state and the first detecting module determines the mobile device changes from a static state to a moving state; a navigation module that acquires a current location of the mobile device as a starting point, reads the recorded position as an ending point, and calculates a path from the starting point to the ending point; and the navigation module displays the calculated path on the electronic map as a color line.

2. The automatic positioning system according to claim 1, wherein the mobile device further comprises an electronic map, the positioning module marks the acquired location on the electronic map, and the navigation module shows the calculated path on the electronic map.

3. The automatic positioning system according to claim 2, wherein the navigation module guides the user to the vehicle by voice.

4. The automatic positioning system according to claim 1, wherein the mobile device further comprises a first detection unit, the first detection module detects a current speed of the mobile device through the first detection unit, and determines if the mobile device is in a moving state or a static state according to the detected speed.

5. The automatic positioning system according to claim 4, wherein the first detection unit is a speed sensor.

6. The automatic positioning system according to claim 1, wherein the mobile device further comprises a second detection unit, the second detection module sends a state detecting command to the vehicle to detect a current speed of the vehicle through the second detection unit, and determines if the vehicle is in a moving state or a static state according to the detected speed.

7. The automatic positioning system according to claim 6, wherein the second detection unit is a speed sensor.

8. An automatic positioning method implemented by a mobile device, the mobile device communicating with a vehicle via a wireless network, the mobile device comprising a first speed sensor and a second speed sensor, the method comprising:
   detecting a current speed of the mobile device by the first speed sensor to determine if the mobile device is in a moving state or a static state in real-time;
   sending a state detecting command to the vehicle and detecting a current speed of the vehicle by the second speed sensor and determine if the vehicle is in a moving state or a static state in real-time according to the detected speed;
   acquiring the location of the mobile device and records the acquired location as a position of the vehicle, under a condition that the second detecting module determines the vehicle changes from a moving state to a static state and the first detecting module determines the mobile device changes from a static state to a moving state; acquiring a current location of the mobile device as a starting point, reading the recorded position as an ending point, and calculating a path from the starting point to the ending point; and displaying the calculated path on the electronic map as a color line.

9. The method according to claim 8, wherein the mobile device further comprises an electronic map, and localization further comprises:
   marking the acquired location on the electronic map; and
   showing the calculated path on the electronic map.

10. The method according to claim 9, wherein navigation further comprises:
    guiding the user to the vehicle by voice.

* * * * *